Dec. 7, 1926.  1,610,112
V. P. WENDLE ET AL
AUTOMOBILE BLOCK
Filed Feb. 23, 1926

Inventors
Virgil P. Wendle &
Martin L. Hunker
By Frease & Bond
Attorneys

Patented Dec. 7, 1926.

1,610,112

UNITED STATES PATENT OFFICE.

VIRGIL P. WENDLE AND MARTIN L. HUNKER, OF DOVER, OHIO, ASSIGNORS TO THE REEVES MANUFACTURING COMPANY, OF DOVER, OHIO, A CORPORATION OF OHIO.

AUTOMOBILE BLOCK.

Application filed February 23, 1926. Serial No. 89,900.

The invention relates to blocks for transporting automobiles and similar vehicles in railway cars and more particularly to a one-piece metal block.

The object of the improvement is to provied a block preferably formed of pressed steel of symmetrical substantially frusto-conical shape, an arcuate depression being formed in the block to provide a seat for the tire or wheel of the vehicle; the side walls of the block as well as the arcuate seat portion being preferably corrugated for the purpose of not only strengthening the structure but also to provide a non-skid surface for contact with the vehicle tire or wheel.

An embodiment of the invention is illustrated in the accompanying drawing, in which—

Figure 1:
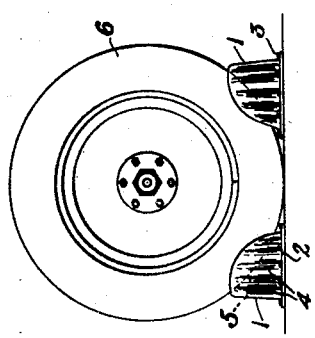
Figure 2:
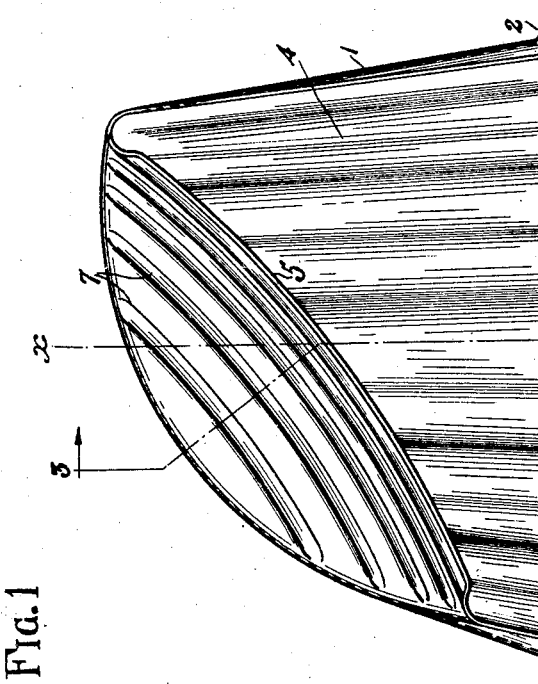
Figure 3:
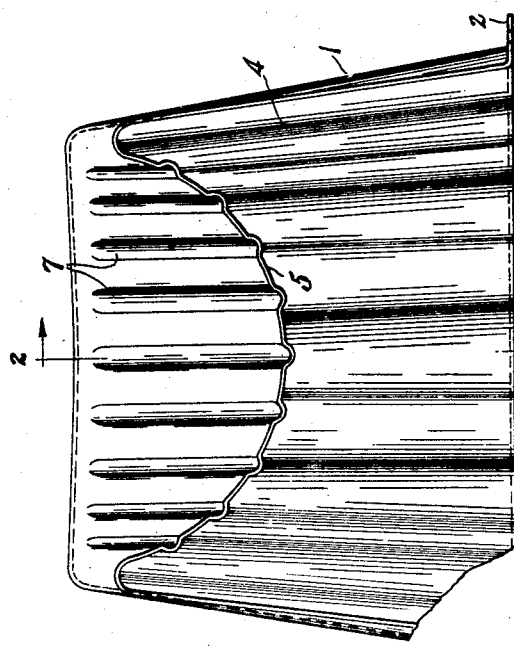

Figure 1 is an elevation of two of the improved blocks as applied to one wheel of an automobile;

Fig. 2, a vertical sectional view through one of the blocks, taken substantially on the line 2—2, Fig. 3, and Fig. 3, a section taken on the line 3—3, Fig. 2.

Similar numerals of reference indicate corresponding parts throughout the drawing.

The improved block, as indicated at 1, may be pressed from a single sheet of steel, of suitable gauge, being of symmetrical substantially frusto-conical form, the axis thereof being preferably normally vertical, as illustrated.

A peripheral flange 2 may be formed at the lower open end of the block, for attaching the same to a car floor, as by nails or screws 3, and for the purpose of strengthening or reinforcing the block, the side walls thereof may be longitudinally corrugated, as at 4.

The upper, closed portion of the block is pressed downward and inward, as shown at 5, forming an arcuate, trough-like seat adapted to receive the tire 6 of the vehicle to be transported, and substantially conforming to the contour thereof.

In order to strengthen this seat, as well as to prevent any lateral skidding of the tire therein, longitudinal corrugations or depressions 7, may be formed therein.

When the blocks are installed in a freight car, or the like, for blocking an automobile against movement therein, two blocks are used for each wheel or tire of the automobile, as shown in Fig. 1.

Each of these blocks is attached to the car floor, by means of nails or screws driven through the flange thereof, at points equidistant from the vertical center of the wheel, and in position to receive the tire in the arcuate seats 5, provided in the blocks for that purpose..

As each wheel of the vehicle is blocked in this manner there will be no possibility of endwise movement thereof, and since the blocks are fitted snugly against the tires, the weight of the vehicle will exert a straight downward thrust upon the blocks, in line with the vertical axes thereof.

By shaping the arcuate seats, of the blocks, to conform to the contour of the tire, any tendency toward end movement of the car will be transmitted radially from the wheel directly against the seat of one or the other of the blocks, depending upon the direction of said force, and these seats, as well as the side walls of the block, being rigidly constructed, will resist any such force and hold the vehicle firmly in position in the car.

As illustrated in Figs. 2 and 3 the axis of the frusto-conical base, shown at 3—$x$ in Fig. 2 and 2—2 in Fig. 3 is perpendicular to the base 2 of the cone while the tire seat 5 is located at an angle to such axis.

Although the block is above described as being preferably pressed from sheet steel or the like, it should be understood that it is within the scope of the invention, and the appended claims, to form the block of the shape illustrated by casting or forging the same to the form disclosed.

We claim:

1. An automobile block formed of a single sheet of metal of symmetrical frusto-conical shape having its axis perpendicular to its base, and having an integral tire seat formed therein and located at an angle to such axis of the block.

2. An automobile block formed of a single sheet of metal of symmetrical frusto-conical shape, corrugated longitudinally and having its axis perpendicular to its base, and having an integral corrugated tire seat formed therein and located at an angle to such axis of the block.

In testimony that we claim the above we have hereunto subscribed our names.

VIRGIL P. WENDLE.
MARTIN L. HUNKER.